(12) United States Patent
Watts (10) Patent No.: US 8,177,479 B2
(45) Date of Patent: May 15, 2012

(54) MOBILE ENERGY RECOVERY APPARATUS AND METHOD

(75) Inventor: Ralph C. Watts, Adel, IA (US)

(73) Assignee: Pineview Group. LLC, Adel, IA (US)

( * ) Notice: Subject to any disclaimer, the term of this patent is extended or adjusted under 35 U.S.C. 154(b) by 0 days.

(21) Appl. No.: 12/837,225

(22) Filed: Jul. 15, 2010

(65) Prior Publication Data

US 2011/0011072 A1    Jan. 20, 2011

Related U.S. Application Data

(60) Provisional application No. 61/225,831, filed on Jul. 15, 2009.

(51) Int. Cl.
   *F03D 9/00* (2006.01)
(52) U.S. Cl. .......................... 415/4.1; 415/184; 415/905
(58) Field of Classification Search .................... 290/44, 290/55; 415/4.1, 184, 905, 909, 2.1, 4.2, 415/4.3, 4.4, 4.5; 180/165
   See application file for complete search history.

(56) References Cited

U.S. PATENT DOCUMENTS

| | | | |
|---|---|---|---|
| 264,164 A | 9/1882 | Jackson | |
| 3,111,291 A | 11/1963 | Horton | |
| 3,122,165 A | 2/1964 | Horton | |
| 3,137,464 A | 6/1964 | Horton | |
| 3,237,712 A | 3/1966 | Horton | |
| 4,290,268 A | 9/1981 | Lowther | |
| 4,781,523 A * | 11/1988 | Aylor | 415/218.1 |
| 4,798,257 A | 1/1989 | Kawamura et al. | |
| 5,280,827 A * | 1/1994 | Taylor et al. | 180/165 |
| 5,287,004 A | 2/1994 | Finley | |
| 5,647,221 A | 7/1997 | Garris, Jr. | |
| 5,709,419 A | 1/1998 | Roskey | |
| 6,138,781 A * | 10/2000 | Hakala | 180/2.2 |
| 6,838,782 B2 * | 1/2005 | Vu | 290/55 |
| 6,857,492 B1 | 2/2005 | Liskey et al. | |
| 6,890,153 B2 | 5/2005 | Demers et al. | |
| 2005/0017514 A1 * | 1/2005 | Tocher | 290/55 |
| 2005/0121242 A1 | 6/2005 | Robinson | |

OTHER PUBLICATIONS

International Search Report, Pineview Group, LLC, PCT/US2010/042149, mailed Sep. 16, 2010, 3 pages.

* cited by examiner

*Primary Examiner* — Edward Look
*Assistant Examiner* — Ryan Ellis
(74) *Attorney, Agent, or Firm* — McKee, Voorhees & Sease, P.L.C.

(57) ABSTRACT

An energy recovery apparatus and method for recovering and harvesting energy from passing air is disclosed. Energy recovery and harvesting from passing air is accomplished by creating a pressure differential using high and low pressure ports. The energy represented by the pressure differential is extracted using a mass airfoil device which, in turn, is used to create alternative forms of energy which, in turn, is used to support auxiliary and main systems aboard any moving object or form of transport.

17 Claims, 9 Drawing Sheets

MOBILE ENERGY RECOVERY APPARATUS AND METHOD

CROSS-REFERENCE TO RELATED APPLICATIONS

This application claims priority under 35 U.S.C. §120 to provisional application Ser. No. 61/225,831 filed Jul. 15, 2009, herein incorporated by reference in its entirety.

FIELD OF THE INVENTION

The present invention relates to recovering and harvesting energy expended for providing movement, and more particularly to a mobile energy recovery apparatus and method adapted for use with a moving object for harvesting energy from passing air.

BACKGROUND OF THE INVENTION

The statements in this section merely provide background information related to the present invention and may not constitute prior art.

Ideally, energy expended in setting and keeping objects in motion would optimally be wholly recaptured. Energy recapturing and harvesting is of particular interest as it relates to moving objects such as automobiles, trains, planes, and any like mode of transportation. Objects such as vehicles, which when set in motion have air which continually passes by them. The passing air is one effective medium available for capturing energy from an object that is set and maintained in motion.

Therefore, a need has been identified in the art for providing a new apparatus and method for capturing and even harvesting energy from passing air.

More and more the efforts to drive efficiencies in various types of transportation, such as with automobiles, trains and planes relies heavily on recapturing a portion of the energy expended for providing movement. Therefore, a need has been identified in the art for providing a new mobile energy recovery apparatus and method for recapturing and even harvesting a maximum portion of the energy expended to provide motion from the energy in air passing by the various types of transportation when in motion.

BRIEF SUMMARY OF THE INVENTION

According to one aspect of the present invention, an energy recovery apparatus adapted for use with a moving object for harvesting energy from passing air is disclosed. The energy recovery apparatus includes an airfoil adapted for generating a low pressure from the passing air and a ram air intake for generating a high pressure from the passing air. Together, the low and high pressures provide a pressure differential that is ported to a mass airflow device for harvesting energy from the passing air. In a preferred form, the one or more airfoils include a low pressure port having an inlet in communication with the low pressure side of the airfoil and outlets the airfoil to a low pressure side of a mass airflow device. The ram air intake includes a high pressure port that outlets the ram air intake to a high pressure side of the mass airflow device.

A new method for recovering energy from air passing by a moving object is also disclosed. The method includes providing a moving object with means for creating a pressure differential from the air passing by the object, porting the pressure differential to a mass airflow device, converting the pressure differential to a useable form of energy using the mass airflow device, and harvesting the useable form of energy from air passing by the moving object. In a preferred form, the method also includes the step of creating the pressure differential by an airfoil adapted for generating a low pressure from the passing air and a ram air intake for generating a high pressure from the passing air. The method also includes running a power consuming device or component with the useable form of energy or pressure differential, or charging a power storing device or component using the useable form of energy or the pressure differential. The moving object is preferably an airplane, train, automobile or other form of transportation, such as a semi-trailer truck.

BRIEF DESCRIPTION OF THE DRAWINGS

While the specification concludes with the claims particularly pointing out and distinctly claiming the invention, it is believed that the present invention will be better understood from the following description taken in conjunction with the accompanying drawings, in which:

DETAILED DESCRIPTION OF THE PREFERRED EMBODIMENT

The present invention is directed towards an energy recovery apparatus and method.

In that all moving objects have an air stream that passes by them from which potential energy may be recaptured and harvested, the present invention accomplishes at least the aforementioned aspects and thus is applicable for use with any moving object. In most instances, a vehicle, train, or plane constitutes the moving object; however, the present invention is also applicable to other moving objects that would not necessarily fall into the class of a vehicle, train or plane. For example, a glider which requires little if any energy from a motor or other propellant means may be configured with embodiments of the energy recovery apparatus of the present invention to recovery and harvest energy from air passing by the glider. This is only one example. The apparatuses and methods of the present invention apply generally to all forms of transports or transportation. The present invention contemplates application of an energy recovery apparatus wherever objects in motion are exposed to passing air, and not limited to the aforementioned identified possibilities.

Apparatus

Figure 1A:
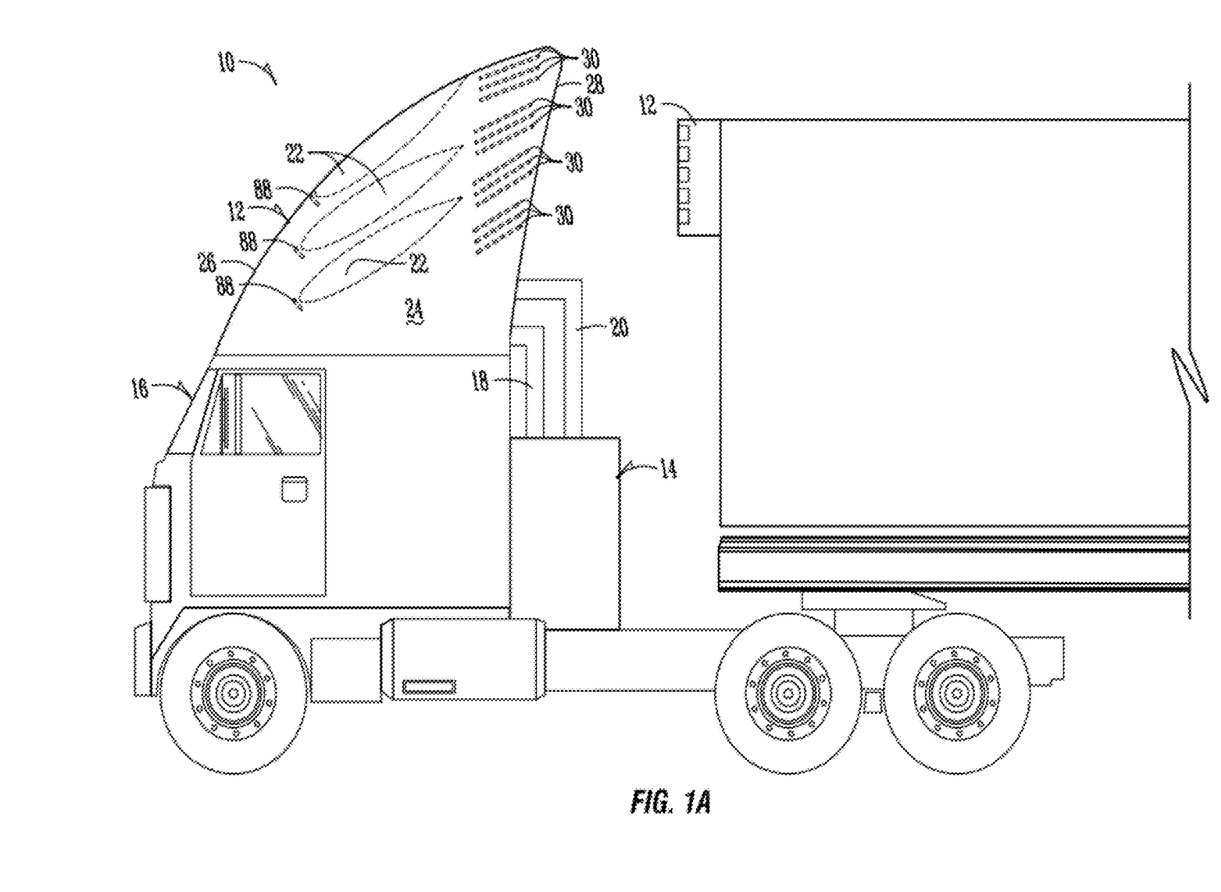
FIGS. 1A-B are side elevation views of embodiments of the present invention.
Figure 1B:
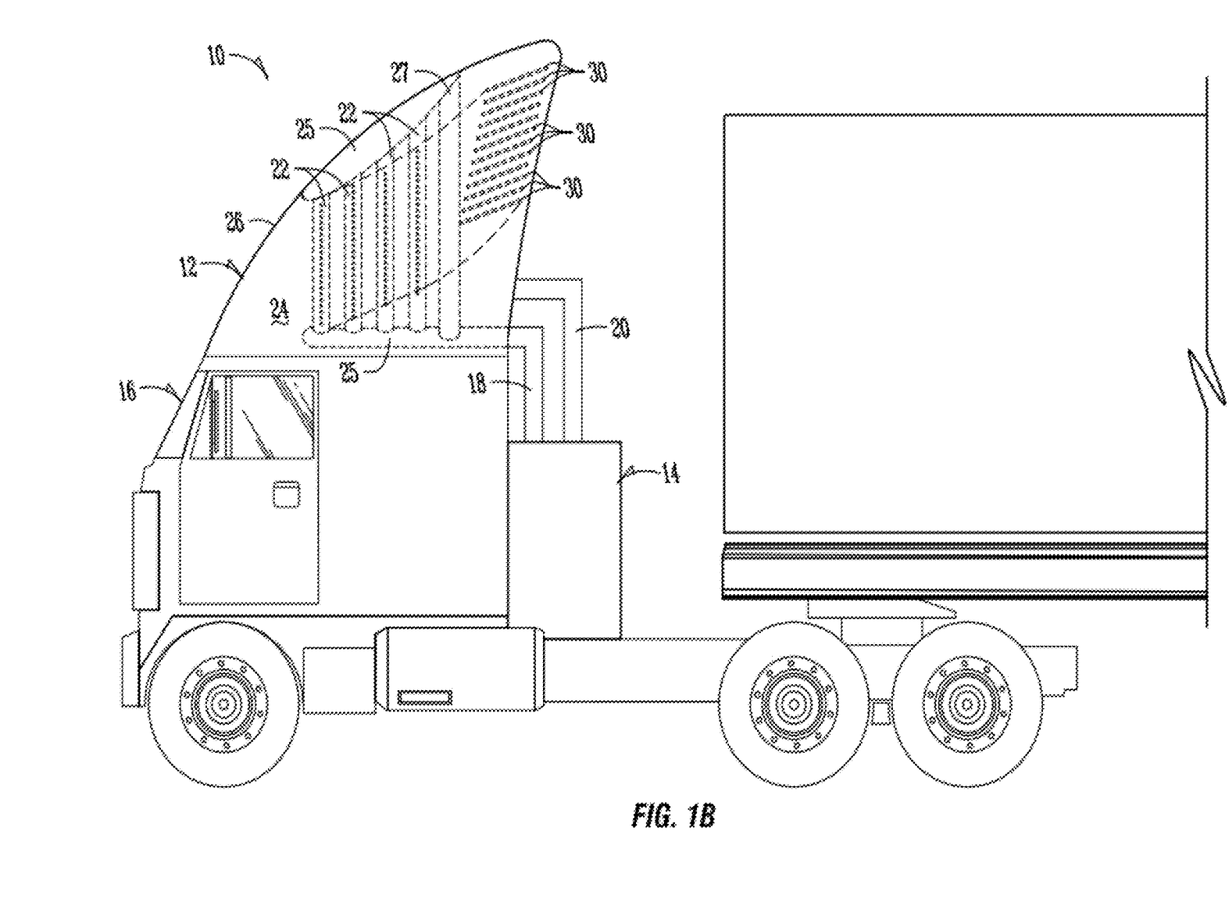
Figure 2A:
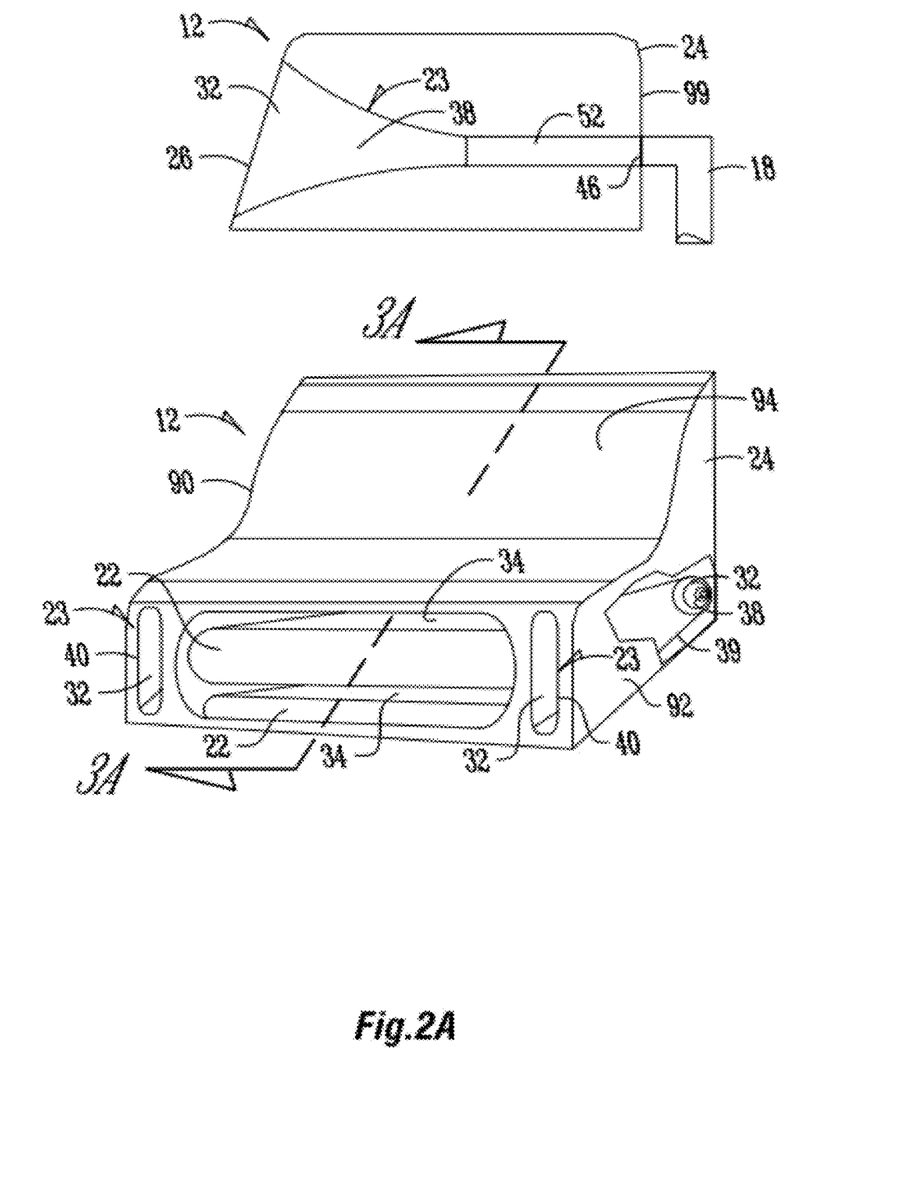
FIG. 2A is a front elevation view of the invention illustrated in FIG. 1A.
Figure 2B:
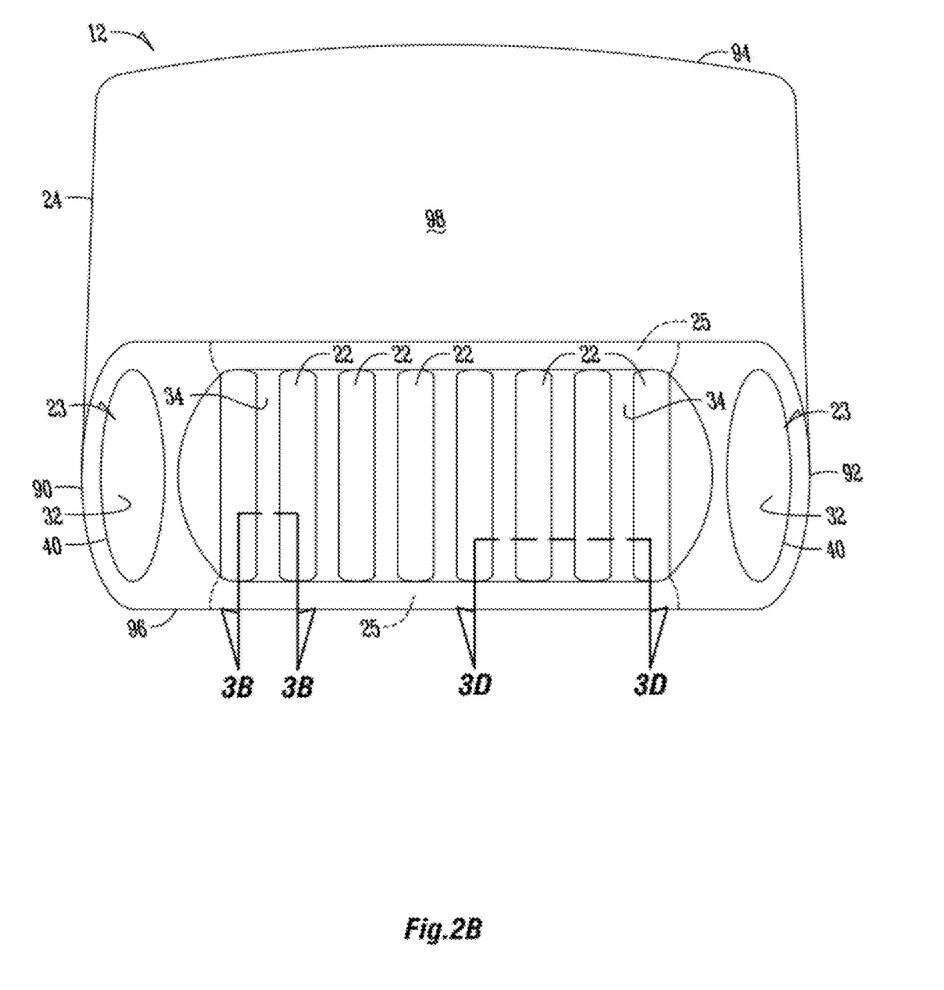
FIG. 2B is a front elevation view of the invention illustrated in FIG. 1B.

FIGS. 1A-B illustrate embodiments of the present invention. For purposes of illustration, the energy recovery system 10 of the present invention is shown as having been configured for a semi-trailer truck, otherwise one type of a moving object. Although a semi-trailer truck is illustrated as one form of transport 16, as previously indicated, the present invention contemplates various platforms for configuring embodiments of the energy recovery system 10 of the present invention thereto for capturing and harvesting energy from passing air. The energy recovery system 10 may be positioned aboard any type of moving object or transport 16 so that it has exposure to passing air. In the case of the semi-trailer truck illustrated in FIG. 1A-B, the energy recovery system 10 is configured into the fairing existing at the top of the cab. These fairings are situated on top of the cab of the vehicle to reduce drag from the trailer by redirecting airflow over top of the trailer. In this case, air that is ordinarily redirected over top of the fairing and the trailer is now used to pass through the energy recovery system 10 for capturing and harvesting energy from the passing air. Application of the energy recovery system 10 is not limited to fairings positioned for providing aerodynamic features to a vehicle such as a semi-trailer truck as illustrated in FIG. 1A-B, but extends to any location aboard a moving object such as a vehicle, train, or plane where location or such position would have exposure to passing air.

Figure 3A:
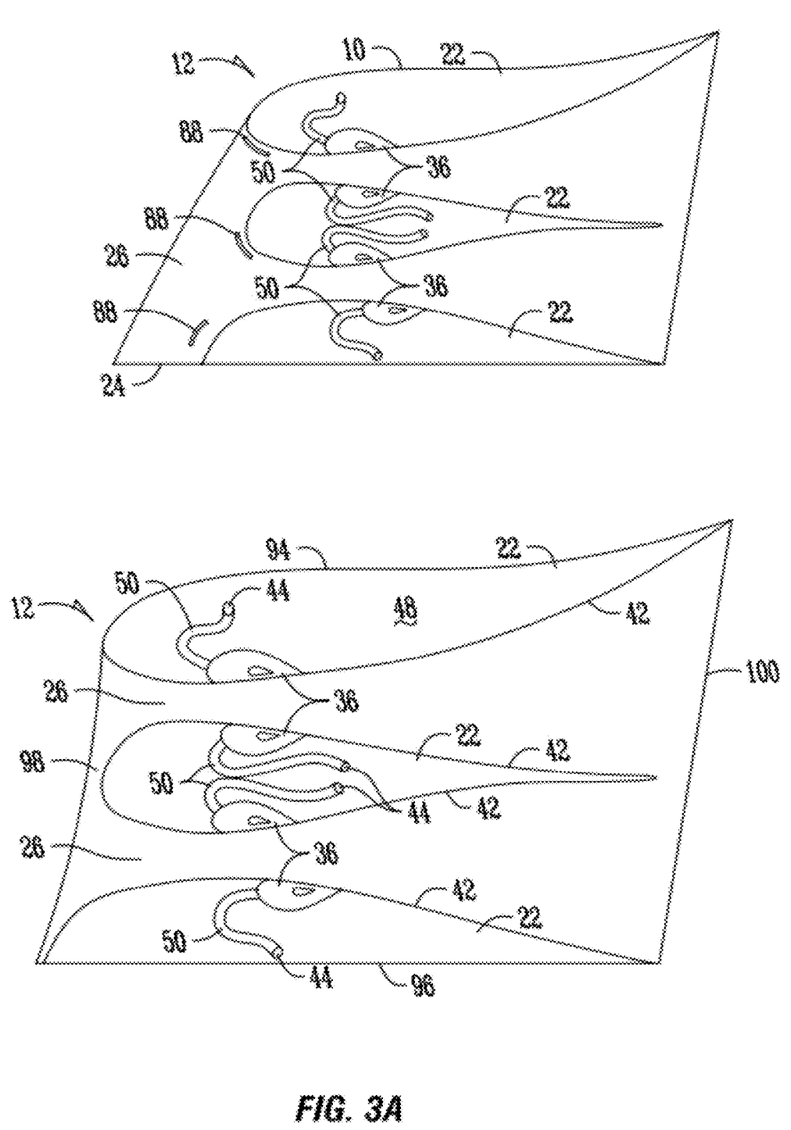
FIG. 3A is a sectional view taken along line 3A-3A in FIG. 2A.
Figure 3B:
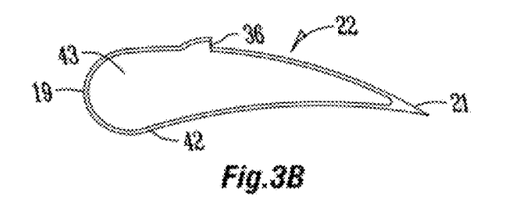
FIG. 3B is a sectional view taken along line 3B-3B in FIG. 2B.
Figure 3C:
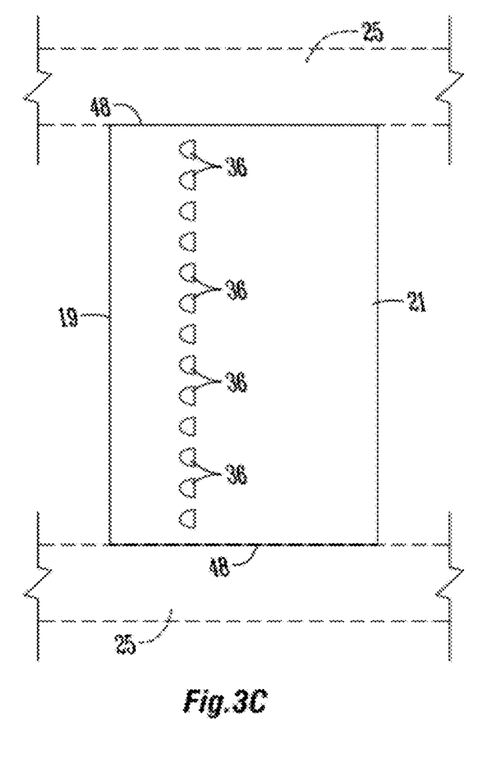
FIG. 3C is a side view illustration of the air foil shown in FIG. 3B.

In one embodiment, energy recovery system 10 includes an energy capturing device 12 connected in working operation to an energy harvesting device 14. The energy capturing device 12 and the energy harvesting device 14 together provide an embodiment of the energy recovery system 10 of the present invention. The aerodynamic fairing ordinarily positioned atop the cab of a tractor is formed by a molded housing 24 that has a continuous outer surface for diverting air over top of the trailer to reduce drag. In one embodiment of the present invention, energy recovery system 10 is configured into molded housing 24 whereby the molded housing 24 includes an inlet 26 and an outlet 28 for passing air therethrough. A plurality of directional louverings 30 may be configured at the outlet 28 of molded housing 24 for directing air passing through the outlet of molded housing 24 overtop of the trailer to prevent drag on the trailer. Instead of being mounted atop the tractor, the energy capturing device 12 could also be positioned at the front near the top of the trailer so as to be exposed to a portion of air. Multiple energy capturing devices 12 could be positioned about a transport 16 at positions best suited for capturing and harvesting energy from passing air. For example, as shown in FIG. 1A, an energy capturing device 12 could be positioned both atop the cab of the tractor and at the front near the top of the trailer (as shown in FIG. 1A) for capturing energy from multiple locations aboard transport 16. In one embodiment of the invention, the energy capturing device 12 includes one or more horizontally oriented (see FIG. 1A) or vertically oriented (see FIG. 1B) and laterally positioned airfoils 22 within molded housing 24. Preferably, the airfoil 22 is symmetric in shape or shaped generally as illustrated in FIG. 3B. The number and size of the airfoils 22 could be increased or decreased. For example, the airfoils 22 could be 2-3 inches in width and there could be 50-60 airfoils 22 in an airfoil array either in the horizontal configuration shown in FIG. 1A or in the vertical orientation shown in FIG. 1B. A half portion of a symmetrical airfoil is positioned at top and bottom surfaces of the molded housing 24 as best illustrated in FIG. 3A. Leading edge wing slats 88 are shown positioned at the leading edge of airfoil 22. Leading edge wing slats 88 are optional depending upon the application of energy capturing device 12. The energy capturing device 12 is in communication with energy harvesting device 14 by a channel, duct, conduit, or other pressure communicating means. In a preferred form, the energy capturing device 12 is in communication with energy harvesting device 14 via high pressure conduit 18 and low pressure conduit 20.

Figure 3D:
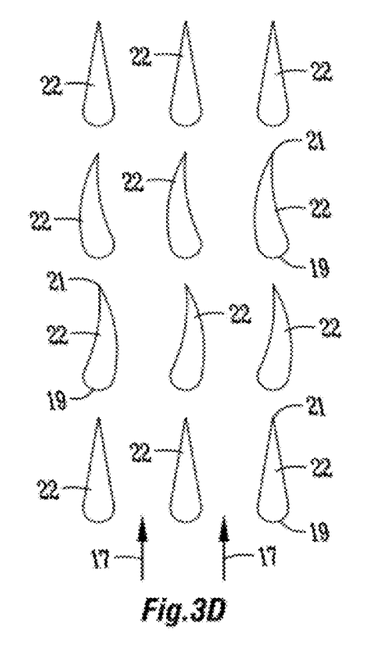
FIG. 3D is a sectional view taken along line 3D-3D in FIG. 2B.

Working details of the energy capturing device 12 will now be further detailed as they relate to FIGS. 2A-B and 3A-D. The energy capturing device 12 provides means for capturing high and low pressure, which represents a pressure differential. As previously indicated, the one or more airfoils 22 are preferably symmetrical about a center axis or plane of symmetry for the airfoil 22. Forming the airfoil 22 to have symmetry discourages opposing pressure from originating on opposite sides of airfoil 22 when air passes by it. The airfoil 22 may also be shaped as illustrated in FIG. 3B with the outer curvature being different for both sides spaced between leading edge 19 and trailing edge 21. The airfoil 22 may be oriented horizontally (shown in FIG. 2A) or vertically (shown in FIG. 2B) within molded housing 24. The horizontal airfoils run laterally terminating generally at right vertical wall 92 and left vertical wall 90 of molded housing 24. The vertical airfoils run vertically terminating generally at top wall 94 and bottom wall 96 of molded housing 24. A portion of the airfoil constituted by half the full airfoil 22 (where the other portion of the airfoil is mirrored along line of symmetry of the airfoil) is removed so that a half portion of the airfoil 22 is secured to the top wall 94 and bottom wall 96 of the molded housing 24 in the version shown in FIG. 2A. Airfoil 22 may be constructed similar to a traditional airfoil having a skeleton with a skin portion forming an outer surface 42 of the airfoil 22 and a cavity 43 within the airfoil 22. Configured into the outer surface 42 of airfoil 22 is a plurality of low pressure expulsion ports 36 or other pressure capturing/gathering structure and/ or devices (see FIG. 3C). The low pressure expulsion ports 36 may be positioned along the airfoil 22 at a location where an optimal low pressure area, field or zone is established. For example, the airfoils 22 may be arranged in an airfoil array relative to each other as shown in FIG. 3D. The front row of airfoils 22 may be configured in a generally teardrop shape or symmetrical shape to create a venturi effect from the passing airflow 17, with each subsequent row of airfoils having a desired shape to generate a low pressure field or area. Other configurations or arrays are also contemplated as circumstances may suggest or rendered expedient. Thus, as air enters through low pressure inlets 34 in molded housing 24, the air passes over the outer surface 42 of each airfoil 22. The air passing over the outer surface 42 of the airfoil 22 is accelerated due to the shape of the airfoil 22 resulting in the establishment a low pressure area, field or zone preferably where the low pressure expulsion ports 36 are located on the airfoil 22. In one aspect of the present invention, leading edge wing slats 88 are placed along the forward edge of each airfoil 22 as illustrated in FIGS. 1A and 3A. The leading edge wing slats 88 cause air passing through high pressure inlet 32 of molded housing 24 to be accelerated to a velocity greater than what would otherwise be attainable without the use of leading edge wings slats 88. The increase in velocity of the air passing over airfoil 22 increases the low pressure area, field or zone established about the outer surface 42 of the airfoil 22 near a low pressure expulsion port 36. Each low pressure expulsion port 36 opens outward toward and terminates at the outer surface 42 of airfoil 22. Surfaces or walls forming the low pressure expulsion port 36 may be tapered or angled relative to the outer surface 42 of airfoil 22. As shown in FIG. 3A, each low pressure expulsion port 36 is connected to a low pressure duct 50 whereby the low pressure (vacuum) established at the low pressure expulsion port(s) 36 at the outer surface 42 of airfoil 22 is communicated through the cavity 43 within airfoil 22 via low pressure duct 50. In another aspect of the present invention, the cavity 43 of the airfoil 22 may provide a duct for vacuum or low pressure to be communicated through and out of airfoil 22. Low pressure duct 50 exits airfoil 22 via low pressure induction port 44. Preferably, low pressure induction port(s) 44 exit the airfoil 22 through terminal lateral ends 48 of airfoil 22. Other aspects of the present invention contemplate that low pressure induction port(s) 44 could be configured into airfoil 22 to exit an alternative surface, such as a position on the outer surface 42 of airfoil 22. As illustrated in FIG. 1B, the cavity 43 may be connected in communication with an accumulator 25. For example, each airfoil may include a hollow internal cavity as shown in FIG. 3B that is connected at its terminal ends in communication with a top and bottom positioned accumulator 25, or reservoir. The two accumulators 25 may be connected in communication with each other by a bridge 27 comprising a guideway for air, such as pipe, tubing or conduit. Low pressure induction ports 44 or accumulator 25 are connected to the energy harvesting device 14 through low pressure conduit 20. In this configuration, the influence of the low pressure or vacuum established at the outer surface 42 of airfoil 22 is communicated through low pressure expulsion port 36 and low pressure duct 50 or accumulator 25 to low pressure induction port 44. Once the low pressure is communicated through airfoil 22 it is further communicated out of airfoil 22 to an energy harvesting device 14 through low pressure conduit 20. The present invention is not limited by the configuration of the airfoil 22 illustrated in FIGS. 3A-D. For example, airfoil(s) 22 could be oriented vertically so that terminal lateral ends 46 of each airfoil 22 are attached to top wall 94 and bottom wall 96 of the molded housing 24, as shown in FIG. 1B. Further, partial airfoils formed along a line of symmetry for a symmetrical airfoil (representative of a half portion of airfoil 22) could be attached and ran along the left vertical wall 90 and right vertical wall 92 of the molded housing 24. Furthermore, the present invention contemplates other means in addition to airfoils for providing a low pressure or vacuum, whereby the low pressure (vacuum) influence is communicated to an energy harvesting device 14. For example, a mechanically driven low pressure/vacuum source may be used to supply low pressure or a vacuum. Low pressure (vacuum) storage devices may be used to store excess or generated low pressure. These systems could be used in combination with energy capturing device 12 to absorb the fluctuations or inconsistencies of low pressure (vacuum) production, which could be used to provide low pressure or vacuum that could be communicated to an energy harvesting device. Other configurations for both the orientation and outer surface design of the airfoils 22 are contemplated so as to obtain maximum low pressure along the outer surface 42 of the airfoil 22. For example, the outer surface 42 of airfoil 22 may be altered at, near or approximate to the low pressure expulsion port 36 to thereby lower the pressure at the low pressure expulsion port 36 to maximize the extraction and conversion of passing air to a low pressure that can be then communicated to the energy harvesting device 14. Complimentary structures such as the leading edge wing slats 88 may also be configured relative to airfoil 22 to further lower the pressure (or increase the vacuum) at the pressure expulsion ports 36 by, for example, accelerating the velocity of air passing over the outer surface 42 of airfoil 22. Optionally, low pressure inlets 34 of molded housing 24 may be shaped so as to accelerate air passing through the inlet 26 of the molded housing 24 to lower the pressure (increase the vacuum) at the pressure expulsion ports 36 to make for more efficient conversion and use of the passing air. Similarly, the outlet 28 of the molded housing 24 may have one or more louvered surfaces or panels for further accelerating or drawing air out of the molded housing 24 to thereby increase further the potential for a lower pressure or higher vacuum at the low pressure expulsion port(s) 36 in airfoil 22.

In one aspect of the present invention, directional louverings 30 may be configured at the outlet 28 of molded housing 24 for directing the flow of air exiting the molded housing to decrease the pressure experienced at the low pressure expulsion ports 36 and further direct exiting air from the molded housing 24 overtop of a trailing body, such as a trailer.

Also provided within molded housing 24 is a means for capturing high pressure from passing air. In one embodiment, molded housing 24 includes one or more ram intakes 23 generally fabricated into the molded housing 24. The ram air intakes 23 include a high pressure induction port 38 that opens outwardly toward, expanding peripherally and terminating at the outer surface 39 at the inlet 26 of molded housing 24. Each high pressure induction port 38 includes an opening 40 adjacent the outer surface 39 of the ram air intake 23. The walls or surface of the high pressure induction port 38 may be tapered, curved or extend perpendicular relative to the outer surface 39 of the inlet 26 of the molded housing 24. Each high pressure induction port 38 terminates in a high pressure duct 52 in communication with a high pressure expulsion port 46. The high pressure expulsion port 46 passes out of the molded housing 24. The high pressure expulsion port 46 is in communication with high pressure conduit 18 which is in-turn in communication with energy harvesting device 14. Each high pressure induction port 38 is designed so that air entering into the molded housing 24 through high pressure inlet 32 enters the high pressure induction port 38. Because of the shape of the high pressure induction port 38, the pressure of the air entering the high pressure induction port 38 increases providing a higher pressure than otherwise would be attainable from the passing air without having such structure in place. For example, in one aspect of the present invention, the walls or surfaces of the high pressure induction port 38 are tapered inward in a conical (convex) shape to increase the ram affect and head pressure of air within pressure induction port(s) 38. The front surface 98 of molded housing 24 may be configured with multiple high pressure induction ports 38. The high pressure induction ports 38 are preferably configured so that high pressure air is communicated to the high pressure conduit 18 in communication with energy harvesting device 14. The most effective and efficient shapes and surface contours for providing the highest pressure given the velocity of the air are known and contemplated in the art pertaining to the technology of ram air intakes. Thus, alternative embodiments of the high pressure induction ports 38 are thus contemplated.

Figure 4A:
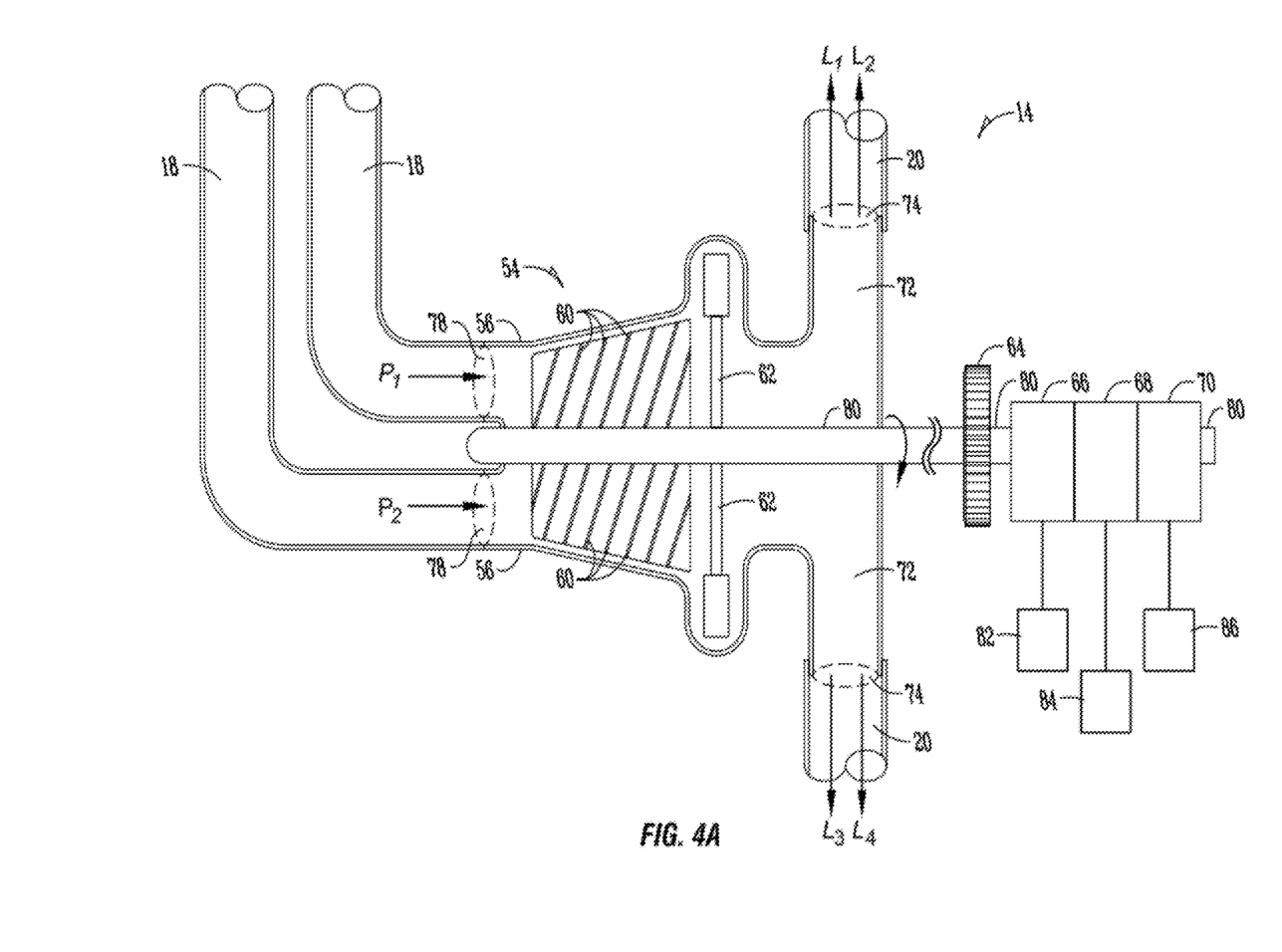
FIG. 4A is an illustration of the mass airflow device and energy harvesting apparatus illustrated in FIG. 1A.
Figure 4B:
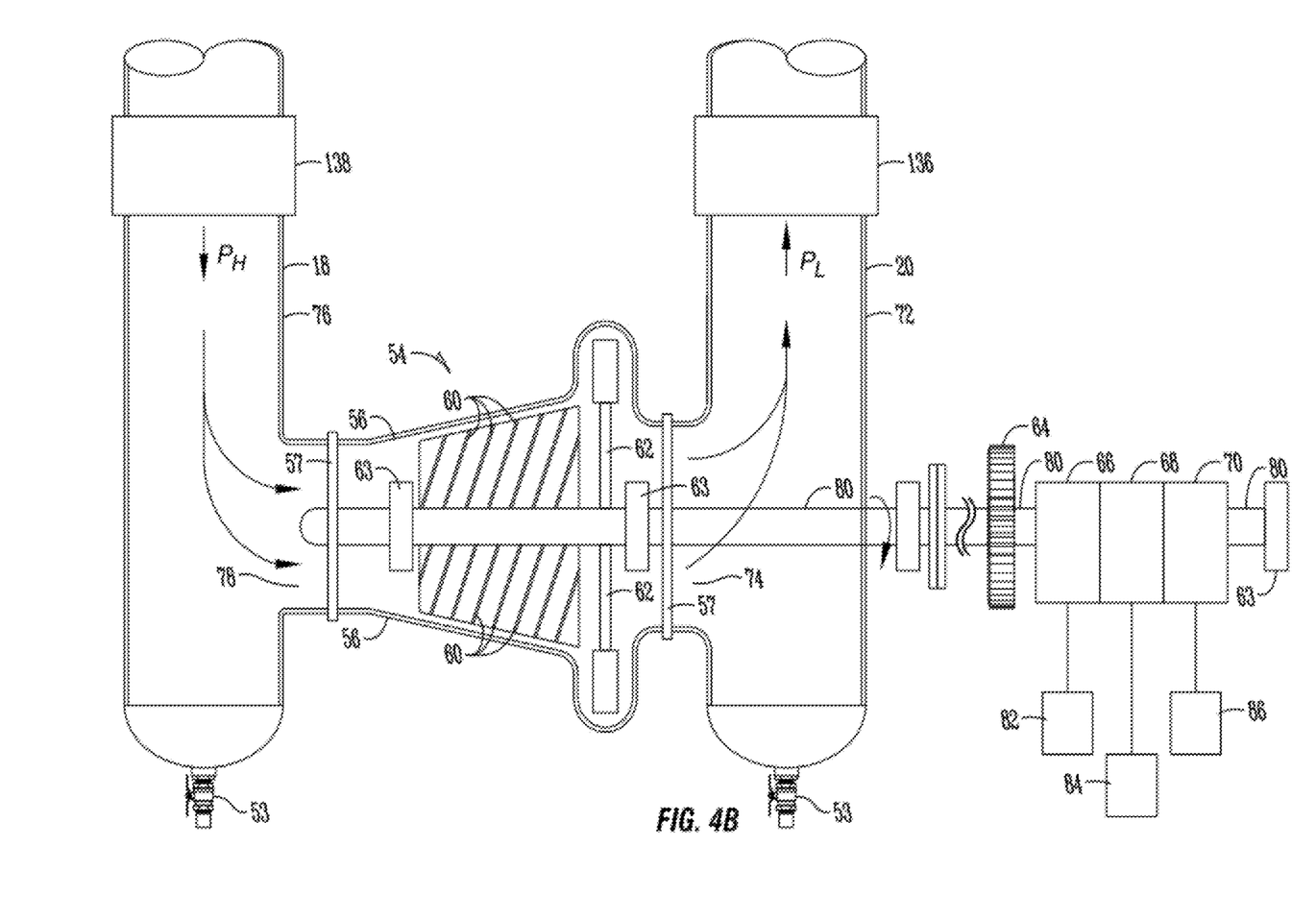
FIG. 4B is an illustration of a mass airflow device and energy harvesting apparatus illustrated in FIG. 1B.

Owing to the creation of low pressure air using airfoils 22 and airfoil surfaces and high pressure air using ram air intake 23, a pressure differential between the high and low pressures generated is communicated through high 18 and low 20 pressure conduits to energy harvesting device 14. The present invention contemplates that high and low pressure generation/creation means may be included in the same component. For example, the same airfoil used to create a low pressure (vacuum) may be used to create a high pressure, such as for example where low pressure expulsion ports are configured into the outer surface of the airfoil and ram air intakes are configured into a leading edge of the airfoil. The present invention contemplates various combinations of low and high pressure generation means not limited to those described. According to the embodiments as previously shown and illustrated, high and low pressure air is captured from passing air that would have otherwise remained untapped. Having captured from the passing air a pressure differential equal to the difference in the high pressure air communicated through high pressure conduit 18 and the low pressure air communicated through low pressure conduit 20, (the energy represented by the pressure differential between the high and low pressure) may now be harvested. Energy extraction from the pressure differential communicated to the energy harvesting device 14 is best illustrated in FIGS. 4A-B. In a preferred form, the energy harvesting device 14 includes at least one mass airflow device 54 for capturing energy from the pressure differential communicated to the energy harvesting device 14. The mass airflow device 54 includes a shroud 56 for housing the component parts operating within shroud 56. The mass airflow device 54 also includes a low pressure side 72 having single or multiple low pressure ports 74 and a high pressure side 76 having single or multiple high pressure ports 78. The low pressure port(s) 74 are in communication with low pressure conduit 20. High pressure port(s) 78 in the high pressure side 76 of the mass airflow device 54 are in communication with high pressure conduit 18 in communication with energy capturing device 12. Both the high pressure port (s) 78 and low pressure port(s) 74 may be connected to the shroud 56 by quick disconnects 57. Both port 74 and 78 may also include liquid trap releases 53 to evacuate moisture accumulations within the system. Within shroud 56 of mass airflow device 54 is a rotor 58 at the center of blades 60 which are positioned circumferentially and extend peripherally outward away from rotor 58. A flywheel 62 rotatably supported by one or more bearings 63 and is preferably attached to rotor 58 (as best illustrated in FIG. 4B). Blades 60 are arranged circumferentially about rotor 58 and fixed at an angle whereby air passing through mass airflow device 54 from the high pressure side 76 to the low pressure side 72 causes rotor 58 to rotate. In fact, due to the low pressure at the low pressure side 72 of mass airflow device 54 and the high pressure of air at the high pressure side 76 of mass airflow device 54, air is drawn with great force through blades 60 thereby causing rotation of rotor 58 and optional flywheel 62. Therefore, in this instance, the pressure differential captured at the energy capturing device 12 and communicated to the energy harvesting device 14 is used to create rotational energy using the mass airflow device 54.

The present invention contemplates that the energy harvesting device 14 may include any device or system configured or capable of converting a change in pressure or a ΔP into another form of usable energy, such as rotational energy. For example, the energy harvesting device 14 could be a positive displacement rotary device or unit, which is known to those in the art and commercially available.

In one embodiment of the present invention, the rotor 58 may be used in combination with one or more gear reducers or mechanical amplifiers 64 connected in driving communication via shaft 80 with one or more components or devices for converting the rotational energy into other useable forms of energy. For example, the rotational energy provided from the mass airflow device 54 may be used to generate electricity using alternator 66, generate compressed air using compressor 68 and/or provide refrigeration or air conditioning using refrigeration unit 70. The rotational energy created by the mass airflow device 54 is not limited to powering the aforementioned components. The present invention contemplates that the rotational energy developed may be used to power, generate or control any desired or existing systems aboard the moving object or transport 16. For example, the alternator 66 could be used to provide electrical power to lights or other auxiliary systems, or for charging an electrochemical cell, such as a battery. Furthermore, the alternator could be used for creating electrical power for driving a wheel assist motor or a regenerative braking system. Further, compressor 68 could also be used for supplying compressed air to auxiliary or other systems aboard the vehicle such as for braking and suspension regulation purposes. Refrigeration generated by unit 70 could be used for providing air conditioning to the cabin of the vehicle or for providing refrigeration to the trailer. Wherever a useable form of energy is needed, such energy may be extracted from passing air and converted to a useable form of energy. Alternatively, the pressure differential provided at the mass airflow device 54 may also be used to operate energy consuming devices aboard the vehicle. For example, the pressure differential provided at the mass airflow device 54 may be used to assist an air brake or suspension system, or wherever else a pressure differential may be converted to a useable form of energy for supporting auxiliary, main power needs and other systems aboard the vehicle. Thus, by capturing high and low pressure with the energy capturing device 12 and providing a pressure differential to the energy harvesting device 14, energy that may have otherwise remain uncaptured from passing air is used to create useable forms of energy aboard the vehicle using the energy recovery system 10.

Method

The present invention also contemplates a method for recovering energy from air passing by a moving object such as a vehicle or other transport type. According to a method of the present invention, an energy recovery system 10 is configured aboard a transport 16 such as a vehicle, train, plane or other mobile object. The energy recovery system 10 is positioned for exposure to passing air when the object or transport 16 is in motion. One method for energy recovery includes capturing energy using device 12 and harvesting the captured energy using device 14. The energy capturing device 12 and energy harvesting device 14 together make up the energy recovery system 10. The energy capturing device 12 includes a molded housing 24 for supporting one or more airfoils 22 therein in a desired configuration. The airfoils 22 may be configured within molded housing 24 so that they are oriented horizontally (see FIG. 1A) or vertically (see FIG. 1B) within the molded housing 24. Airfoils 22 are preferably symmetrical whereby the roof or floor of the molded housing or the left or right vertical wall of the molded housing may also include a portion of an airfoil 22, where the portion is equal to one symmetrical half of an airfoil taken along a plane of symmetry. The airfoils 22 include low pressure expulsion ports 36 spaced along the outer surface 42 of airfoil 22. The low pressure expulsion ports 36 are spaced on the outer surface 42 of airfoil 22 at locations where the lowest pressure occurs. Each low pressure expulsion port 36 includes an opening that opens outwardly toward the outer surface 42 of each airfoil 22. The low pressure expulsion port 36 is in communication with low pressure duct 50, which terminates in a low pressure induction port 44 or accumulator 25 at one or both ends 48 of the airfoil 22. The low pressure duct 50 or accumulator 25 is in communication with low pressure conduit 20 which is, in-turn, in communication with a low pressure side 72 of a mass airflow device 54 associated with the energy harvesting device 14. Molded housing 24 also includes a ram air intake 23. The ram air intake 23 includes a high pressure induction port 38 opening outward toward an outer surface 39 of the molded housing 24. Each high pressure induction port 38 has an opening 40. The high pressure induction port 38 is in communication with a high pressure duct 52 which is in-turn, in communication with a high pressure expulsion port 46. The high pressure expulsion port 46 is in communication with a high pressure side 76 of the mass airflow device 54 of the energy harvesting device 14. As air enters into the molded housing 24 through inlet 26 and subsequently passes out of the molded housing 24 through outlet 28, the energy recovery system 10 captures and recovers energy from the passing air. The low pressure side of the energy recovery system 10 is provided by the low pressure expulsion ports 36 on airfoil 22. As air passes over the airfoil 22 and accelerates, a low pressure (vacuum) is established at the low pressure expulsion port 36. Similarly, as air passes into the molded housing 24 through high pressure inlet 32 and into ram air intake 23, a high pressure is established at the high pressure induction port 38. The low pressure generated from the airfoil 22 is communicated to the low pressure side 72 of the mass airflow device 54 and the high pressure generated from the ram air intake 23 is communicated to the high pressure side 76 of the mass airflow device 54.

Other means for supporting, contributing to or improving the pressure of the high pressure side or the vacuum of the low pressure side are contemplated as circumstances may suggest or are rendered expedient. For example, the present invention contemplates that in one aspect of the invention an induction fan 136 may be configured within the outlet port of the low side. The induction fan 136 is operatively connected to a motor to thereby decrease the pressure of the low pressure side of the system. Likewise, a forced draft fan 138 driven by a motor, such as an electrical motor, could be configured into the high side of the system to thereby increase the pressure of the high pressure side of the system. For example, the forced draft fan 138 could be configured into the ram air intake or any air stream associated with the high pressure side of the system. In another aspect, exhaust pressure, for example, may be siphoned off of the engine, so as to not affect the operation of a turbo charger, to drive induction fans to increase the pressure of the high pressure side of the system. Ideally, an induction fan driven by the turbo charger would have a very low impedance so as to not affect operation of the turbo charger. Generally, any excess energy associated with the engine or operation of the vehicle may be used to drive induction fans for increasing the pressure of the high pressure side or decreasing the pressure of the low pressure side of the system, and thus thereby increase the pressure differential between the high and low pressure sides for driving the mass airflow device 54.

Figure 5:
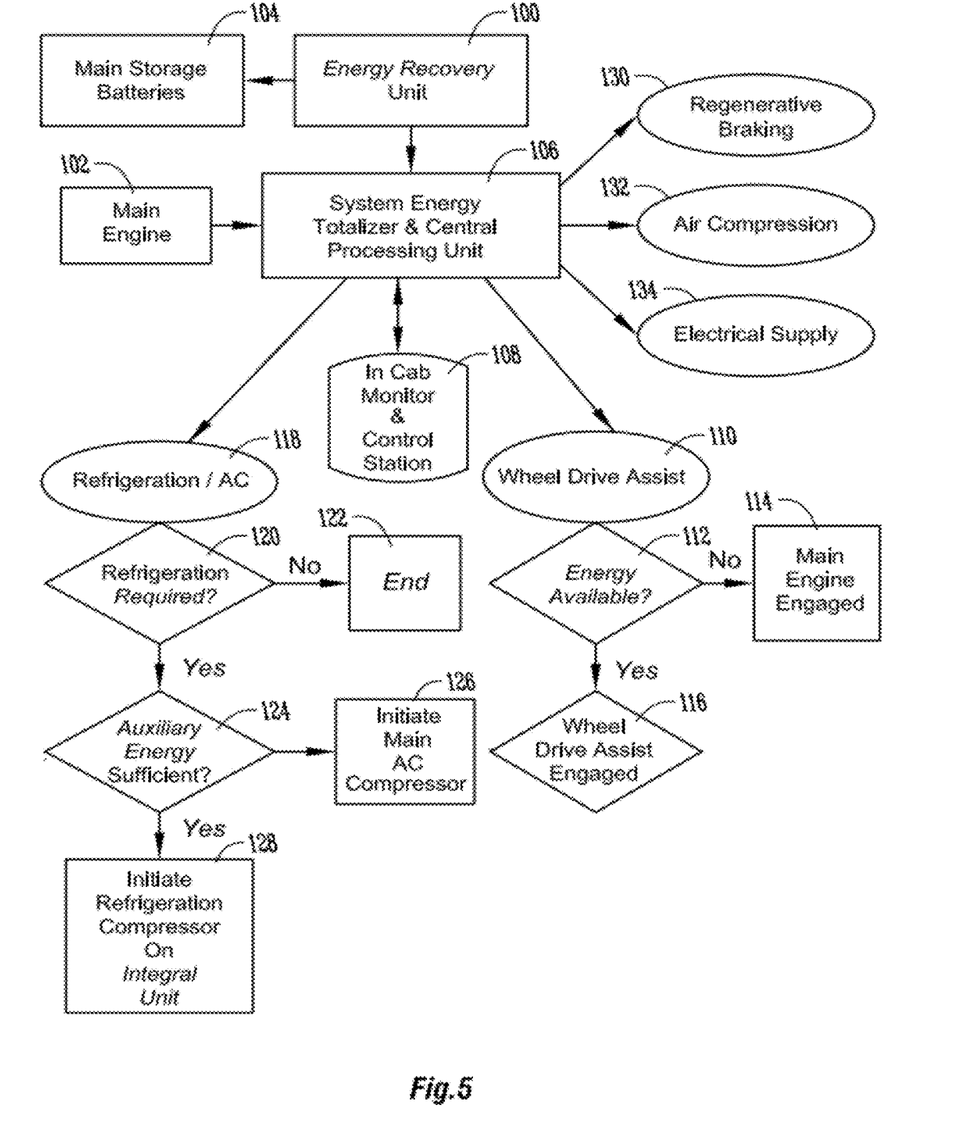
FIG. 5 is a flow diagram of the present invention.

The mass airflow device 54 includes a shroud 56 housing a rotor 58 with peripherally extending blades 60. An optional flywheel 62 is mounted to the rotor 58. The rotor and/or flywheel may be rotatably mounted using bearings 63. The low pressure generated from the low pressure expulsion ports 36 on the airfoil 22 creates a vacuum at the low pressure side 72 of the mass airflow device 54. Further, the high pressure induction ports 38 of the ram air intake 23 create a high pressure at the high pressure side 76 of the mass airflow device 54. The pressure differential at the mass airflow device 54 is converted to rotational energy through rotor 58. Rotor 58, in turn, imparts rotational movement to a gear reducer or a mechanical amplifier 64 which has an output shaft 80 for driving one or more components, such as a generator 66, air compressor 68 and/or refrigeration unit 70. FIG. 5 illustrates one method for controlling use of the energy recovered and captured from passing air. As previously described, an energy recovery system 100 is provided. The energy recovery system 100 can be used to provide electrical power to a plurality of electrical chemical cells such as batteries for providing an electrical store of energy such as illustrated at step 104. A processing unit 106 is provided for measuring energy use, need and allocation of the same to the various energy consuming devices aboard the transport 16. A user interface 108 is in operable communication with processing unit 106 for controlling the distribution of energy provided by the energy recovery system 100. The processing unit 106 is in operable communication with the main engine 102 for regulating power from and between the engine and other subsystems and auxiliary components aboard the transport 16. For example, the processing unit 106 may be used to control a wheel drive assist system 110. The wheel drive assist system 110 could be used to support the main engine 102 for powering the wheels of a vehicle. The processing unit 106 monitors the energy available from the energy recovery system 100. If sufficient energy is available (see step 112), the processing unit 106 switches on the wheel drive or the wheel drive assist motors are engaged (see step 116). If the energy available is insufficient to engage the wheel drive assist motors, the main engine 102 is used to drive the wheels as illustrated at step 114.

In another aspect, the processing unit 106 is used to operate a refrigeration system 118. The processing unit 106 determines if a system aboard the transport has a demand for refrigeration (see step 120). If not, the processing unit 106 ends the process (see step 122). If there is a refrigeration demand, the processing unit 106 determines if there is sufficient auxiliary energy from the energy recovery unit 100 to operate the refrigeration need (see step 124). If there is insufficient energy from an energy recovery unit 100 to operate the refrigeration demand, the processing unit 106 uses power from the main engine 102 to provide the refrigeration needs (see step 126) aboard the transport 16. In the case where sufficient energy is being provided by the energy recovery unit 100, the processing unit 106 initiates support or full operation of the refrigeration system 118 using energy from the energy recovery unit 100 (see step 128).

In yet another aspect of the invention, the processing unit 106 is used to control operation of and provide for regenerative braking 130, air compression 132, and/or an electrical supply 134.

Therefore, an energy recovery apparatus and method has been disclosed. The present invention contemplates numerous variations, options, and alternatives, and is not limited to the specific embodiments described herein.

What is claimed is:
1. A mobile energy recovery apparatus comprising:
an airfoil having a top and bottom outer surface and first and second ends connected in communication with first and second accumulators, wherein at least one of the outer surfaces house a low pressure expulsion port in communication with the first and second accumulators, the accumulators connected in communication with a low pressure side of a mass airflow device;
a ram air intake having a duct terminating in a high pressure induction port in communication with a high pressure side of the mass airflow device;
a low pressure generated at the low pressure expulsion port and a high pressure generated at the high pressure induction port when air passes by the airfoil and into the ram air intake; and
the high and low pressure together providing a pressure differential at a mass airflow device for harvesting energy from passing air.
2. The mobile energy recovery apparatus of claim 1 wherein the airfoil further comprises at least one low pressure side for providing the low pressure when air passes by the airfoil.
3. The mobile energy recovery apparatus of claim 2 wherein the airfoil further comprises a low pressure port having an inlet in communication with the low pressure side of the airfoil.

4. The mobile energy recovery apparatus of claim 3 wherein the low pressure port is connected in communication with the low pressure side of a mass airflow device.

5. The mobile energy recovery apparatus of claim 1 wherein the mass airflow device is adapted to convert the high and low pressures into rotational energy.

6. The mobile energy recovery apparatus of claim 1 further comprising:
   a. a high pressure conduit connected to an outlet of the high pressure induction port and the high pressure side of the mass airflow device; and
   b. a low pressure conduit connected to an inlet of the low pressure expulsion port and the low pressure side of the mass airflow device.

7. The mobile energy recovery apparatus of claim 1 wherein energy harvested from the pressure differential ported to the mass airflow device:
   a. is stored electrochemically for subsequent use; or
   b. used to power one or more energy consuming devices.

8. The mobile energy recovery apparatus of claim 1 comprising a housing with at least one of said airfoils.

9. The mobile energy recovery apparatus of claim 8 wherein said airfoils are oriented:
   a. horizontally and spaced laterally within said housing; or
   b. vertically and spaced laterally within said housing.

10. The mobile energy recovery apparatus of claim 1 wherein said airfoil comprises:
    a. a symmetrically shaped airfoil; or
    b. a half of a symmetrically shaped airfoil.

11. The mobile energy recovery apparatus of claim 1 wherein said airfoil further comprises a leading edge wing slat positionable relative the low pressure expulsion port on the outer surface of the airfoil for increasing the low pressure at the port.

12. The mobile energy recovery apparatus of claim 1 wherein the mass airflow device further comprises:
    a. the low pressure side in communication with the low pressure expulsion port in said airfoil by a low pressure conduit; and
    b. the high pressure side in communication with the high pressure induction port in said ram air intake by a high pressure conduit.

13. The mobile energy recovery apparatus of claim 1 wherein the mass airflow device further comprises a rotor and blades driven by the pressure differential from the high and low pressure ported into the mass airflow device.

14. The mobile energy recovery apparatus of claim 1 wherein the low pressure expulsion port comprises an opening opening outward toward and terminating generally at the outer surface of the airfoil.

15. The mobile energy recovery apparatus of claim 1 wherein:
    a. the high pressure induction port is connected to a high pressure expulsion port in the ram air intake by a high pressure duct; and
    b. the low pressure expulsion port is connected to a low pressure induction port in the airfoil by a low pressure duct.

16. The mobile energy recovery apparatus of claim 1 further comprising an induction fan at the ram air intake or an outlet of a mass airflow device operably connected to a motor for increasing a low pressure side at the mass airflow device.

17. The mobile energy recovery apparatus of claim 1 further comprising a forced draft fan at an inlet of a mass airflow device operably connected to a motor for increasing a high pressure side at the mass airflow device.

* * * * *